US007655400B2

(12) United States Patent
Maruyama

(10) Patent No.: US 7,655,400 B2
(45) Date of Patent: Feb. 2, 2010

(54) SUBSTANCE CAPABLE OF ACCELERATING NUCLEOTIDE CHAIN EXCHANGE REACTION

(75) Inventor: Atsushi Maruyama, Sagamihara (JP)

(73) Assignee: Japan Science and Technology Agency, Kawaguchi-Shi, Saitama (JP)

( * ) Notice: Subject to any disclaimer, the term of this patent is extended or adjusted under 35 U.S.C. 154(b) by 0 days.

(21) Appl. No.: 10/591,268

(22) PCT Filed: Jul. 29, 2004

(86) PCT No.: PCT/JP2004/010824

§ 371 (c)(1),
(2), (4) Date: Jun. 18, 2007

(87) PCT Pub. No.: WO2005/085432

PCT Pub. Date: Sep. 15, 2005

(65) Prior Publication Data

US 2008/0021195 A1 Jan. 24, 2008

(30) Foreign Application Priority Data

Mar. 3, 2004 (JP) ............................. 2004-058336

(51) Int. Cl.
- C12Q 1/68 (2006.01)
- G01N 33/53 (2006.01)
- C12P 19/34 (2006.01)
- C07H 21/04 (2006.01)

(52) U.S. Cl. .............................. 435/6; 435/7.1; 435/7.2; 435/91.1; 536/24.3; 536/24.33

(58) Field of Classification Search .................... 435/6, 435/7.1, 7.2, 91.1; 536/24.3, 24.33
See application file for complete search history.

(56) References Cited

FOREIGN PATENT DOCUMENTS

JP      2001-78769 A      3/2001

OTHER PUBLICATIONS

Aki Sakurai et al.; DNA-sa Kokan Hanno ni Okeru Jinko Kakusan Chaperone no Kino Hyoka; Polymer preprints, Japan, 2003, vol. 52, No. 13, pp. 3722-3723.

Won Jong Kim; Comb-Type Cationic Copolymer Expedites DNA Strand Exchange while Stabilizing DNA Duplex; Chem. Eur. J., 2001, vol. 7, No. 1, pp. 176-180.

(Continued)

*Primary Examiner*—Jezia Riley
(74) *Attorney, Agent, or Firm*—Birch, Stewart, Kolasch & Birch, LLP

(57) ABSTRACT

The purpose of the present invention is to provide a substance having a several ten to several hundred-fold exchange reaction accelerating activity as compared with that of conventional copolymers. In particular, the invention provides a preparation for accelerating an exchange reaction between a nucleotide sequence at specific site of a double stranded DNA or RNA for its homologous nucleotide sequence, the preparation comprising a cationic polymer having a guanidine group-containing main chain and a hydrophilic functional groups as an active ingredient. Thus, a substance having a several ten to several hundred-fold exchange reaction accelerating activity as compared with that of conventional copolymers can be provided. With this substance, the nucleotide chain exchange can be performed at a lower temperature and/or a higher rate than in the prior art.

12 Claims, 9 Drawing Sheets

OTHER PUBLICATIONS

Won Jong Kim; DNA Strand Exchange Stimulated by Spontaneous Complex Formation With Cationic Comb-Type Copolymer, J. Am. Chem. Soc., , 2002, vol. 124, No. 43, pp. 12676-12677.

Kaori Tajima et al.; Simple Basic Peptides Activate DNA Strand Exchange; Chemistry Letters, 2003, vol. 32, No. 5, pp. 470-471.

Kaori Tajima et al.; Acceleration of DNA strand exchange reaction by cationic polymers; Nucleic Acids Research Suppl., 2002, vol. 2, pp. 265-266.

Anwarul Ferdous et al.; Mechanism of Intermolecular Purine-Purine-Pyrimidine Triple Helix Stabilization by Comb-Type Polylysine Graft Copolymer at Physiologic Potassium Concentration, Bioconjugate Chem. 2000, No. 11, pp. 520-526.

SUBSTANCE CAPABLE OF ACCELERATING NUCLEOTIDE CHAIN EXCHANGE REACTION

FIELD OF THE INVENTION

The invention relates to a cationic polymer preparation (composition) for use in manipulation of a double stranded DNA or RNA. Particularly, the invention relates to a cationic polymer preparation used to exchange a nucleotide sequence at a specific site of a double stranded DNA or RNA for its homologous nucleotide sequence (a sequence that is complementary to a sequence of the other DNA or RNA strand).

BACKGROUND OF THE INVENTION

A various types of nucleic acid-acting proteins are involved in the control of structural transition of nucleic acid hybrids within an organism.

The nucleocapsid (NC) protein in retrovirus transfers DNA chain from one hybrid to more stable hybrid and plays some roles in viral infection ((a) Z. Tsuchihashi and P. O. Brown, J. Virol. 68, 5863(1994); (b) M, Lapadat-Tapolsky, C. Pornelle, C. Borie and J-L. Darlix, Nucleic Acids Res. 23, 2434 (1995)). NC protein has an activity to stimulate destruction and reassembly of base pairs, and acts as a nucleic acid chaperon to help appropriate hybridization of nucleic acids. ((a) W. Wu, L. E. Henderson, T. D. Copeland, R. J. Gorelick, W. J. Bosche, A. Rein and J. G. Levin, J. Virol. 70, 7132 (1996); (b) X. Ji, G. J. Klarmann and B. D. Preston, Biochemistry 35, 132 (1996); (c) V. Tanchou, C. Gabus, V. Rogemond and J-L. Darlix, J. Mol. Biol. 252,563 (1995)).

RecA protein has a multivalent binding site to DNA and forms an intermediate complex with double stranded DNA (dsDNA) and single stranded DNA (ssDNA). ((a) J. W. Roberts, C. W. Roberts, N. L. Craig and E. M. Phizicky, Cold Spring Harbor Symp. Quant. Biol. 43,917 (1979); (b) T. Shibata, C. DasGupta, R. P. Cunningham and C. M. Radding, Proc. Natl. Acad. Sci. USA 76, 1638 (1979); (c) K. Mcentee, G. M. Weinstock and I. R. Lehman, Proc. Natl. Acad. Sci. USA 76, 2615 (1979); (d) E. Cassuto, S. C. West, J. Mursalim, S. Conlon and P. Howard-Flanders, Proc. Natl. Acad. Sci. USA 77 and 3962 (1980)).

Since the sequence specificity and assembly property of a nucleic acid molecule are fully elucidated, they can be used for a molecular construction having a desirable structure at a molecular level. A various types of molecules such as a DNA molecule machine ((a) B. Yurke, A. J. Turberfield, A. P. Mills Jr., F. C. Simmel and J. L. Neumann, Nature 406, 605 (2000); (b) H. Yan, X. Zhang, Z. Shen and N. C. Seeman, Nature 415 and 62 (2002)), a nano assembly ((a) B. Liu, N. B. Leontis and N. C. Seeman, Nanobiology 3, 177 (1994);

(b) E. Winfree, F. Liu, L. A. Wenzler and N. C. Seeman, Nature 394, 539 (1998)), and a molecule computer ((a) L. M. Adleman, Science 266, 1021 (1994) ; (b) K. Sakamoto, H. Gouzu, K. Komiya, D. Kiga, S. Yokoyama, T. Yokomori, and M. Hagiya, Science 288, 1223 (2000)) are proposed. Therefore, an artificial substance that can manipulate structural transition of a nucleic acid molecule will be a useful tool not only in the biotechnology field but in the nanotechnology field.

The inventors already have reported interaction between cationic comb-type copolymer (Cationic comb-type copolymers: CCCs) comprising cationic poly(L-lysine) (PLL) backbone and water-soluble side chain of dextran and DNA (A. Maruyama, M. Katoh, T. Ishihara and T. Akaike, Bioconjugate Chem. 8, 3 (1997); A. Maruyama, H. Watanabe, A. Ferdous, M. Katoh, T. Ishihara and T. Akaike, Bioconjugate Chem. 9,292 (1998)). A comb-type copolymer with a higher degree of grafting accelerates DNA hybridization (H. Torigoe, A. Ferdous, H. Watanabe, T. Akaike and A. Maruyama, J. Biol. Chem. 274, 6161 (1999); A. Ferdous, T. Akaike and A. Maruyama, Bioconjugate Chem. 11, 520 (2000)), and stabilizes the double strand and ternary strand of DNA. Furthermore, it was proved that CCCs stimulate the DNA strand exchange reaction between dsDNA and ssDNA homologous thereto, and accelerates the rate more than spermine and N,N,N-trimethyl hexadecyl ammonium bromide (cetyl trimethyl ammonium bromide: CTAB) (50,000 fold at 37□) (W. J. Kim, T. Ishihara, T. Akaike and A. Maruyama, Chem. Eur. J. 7, 176 (2001)). The copolymer is shown to have nucleic acid chaperon activity and useful in nucleic acid analysis.

A nucleic acid acting protein shares one or more cluster in common comprising basic amino acids, i.e., lysine and arginine. However, the composition of the basic amino acid in these clusters is irregular, and significantly differs among proteins. For example, histon protein contains quite a lot of lysine and arginine residues, while protamin contains little lysine residue (H. Busch, in: Histones and Other Nuclear Proteins, p. 28, Academic Press., New York (1965)). These facts suggest that lysine and arginine may interact with the nucleic acid in a different mechanism. As a basic functional group, lysine has a primary amino group while arginine has a guanidino group.

In physiological pH, the primary amino group and the guanidino group are positively charged. It is reported that in physiological pH, the interaction of the peptide having high content of lysine or arginine with DNA is mainly ionic action, while the interaction of peptide having high content of arginine with DNA or RNA involves hydrogen bond that is stronger than ionic action (F. A. Cotton, V. W. Day, E. E. Hazen Jr. and S. Larsen, J. Am. Chem. Soc. 95, 4834 (1973); G. Lancelot, R. Mayer and C. Helene, Biochem. Biophys. Acta 564, 181 (1979); K. M. Weeks, C. Ampe, S. C. Schultz, T. A. Steitz and D. M. Crothers, Science 249, 1281 (1990)).

Patent document 1: Japanese published unexamined application 2001-78769

Non patent document 1: A. Ferdous, T. Akaike and A. Maruyama, Bioconjugate Chem. 11, 520 (2000)

Non patent document 2: W. J. Kim, T. Ishihara, T. Akaike and A. Maruyama, Chem. Eur. J. 7,176 (2001).

SUMMARY OF THE INVENTION

Problems to be Solved by the Invention

As mentioned above, the inventor already has provided a cationic polymer as a substance that can accelerate nucleotide chain exchange reaction between a double stranded chain and a single stranded chain complementary thereto. However, in order to further improve an analysis rate, and facilitate application to various fields of nucleic acid biotechnology and nanotechnology, development of a substance having further improved acceleration activity is still in need.

In order to solve the problem, the inventors analyzed basically the function of conventional copolymers and succeeded in development of a substance having a higher accelerating activity, and accomplished the invention.

Means for Solving the Problems

The present invention relates to a preparation for accelerating an exchange reaction between a nucleotide sequence at a specific site of a double stranded DNA or RNA and its homologous nucleotide sequence, the preparation comprising a cationic polymer having a guanidine group-containing main chain and a hydrophilic functional group, as an active ingredient.

ADVANTAGE OF THE INVENTION

The present invention has provided the having an exchange reaction accelerating activity of several ten to several hundred times as compared with that of conventional copolymers. Thus, compared with the prior art, the nucleotide chain can be exchanged at a lower temperature and/or at a higher rate.

The double stranded DNA or RNA refers to a chain that can maintain a higher-order structure formed between DNA or RNA with the paring of complementary base pairs (or nucleotide) of adenine (A), thymine (T), guanine (G) and cytosine (C) in case of DNA, and A, uracil (U) and G, C in case of RNA. In this invention, DNA or RNA as above may be isolated from biogenic substance, or present in a tissue section of a living body without isolation. Furthermore, a synthesized double-stranded DNA or RNA is also included.

The nucleotide sequence at the specific-site of DNA or RNA as above may be a nucleotide sequence of any sites, such as a sequence at an end or intermediate of a straight chain DNA or RNA. Its homologous nucleotide sequence means that the bases constituting their sequences are substantially identical. The phrase "substantially identical" means that a nucleotide sequence at the specific site mentioned above and its homologous sequence have at least 90%, preferably 95% identical segment of A, T and G, C, while T being optionally replaced by U.

Therefore, an exchange reaction means that the nucleotide sequence at the specific site of a single chain of the double stranded DNA or RNA comprising complementary two chains is replaced by its homologous nucleotide. Particularly, the exchange is carried out as follows: the nucleotide sequence at the specific site of the double stranded DNA is replaced by its homologous nucleotide sequence of the single stranded DNA or RNA; or the nucleotide sequence at the specific site of the double stranded RNA is replaced by its homologous nucleotide sequence of the single stranded DNA or RNA.

The homologous nucleotide sequence in the single stranded DNA or RNA may comprise either the whole sequence of the single stranded DNA or RNA, or any part thereof.

Exchange or an exchange reaction means that the nucleotide sequence at the specific site of the double stranded DNA or RNA is simply replaced and re-organized by its homologous nucleotide sequence of the single stranded DNA or RNA. The reaction does not therefore involve removal of the naive nucleotide sequence at the specific site.

BEST MODE FOR CARRYING OUT THE INVENTION

Figure 1:
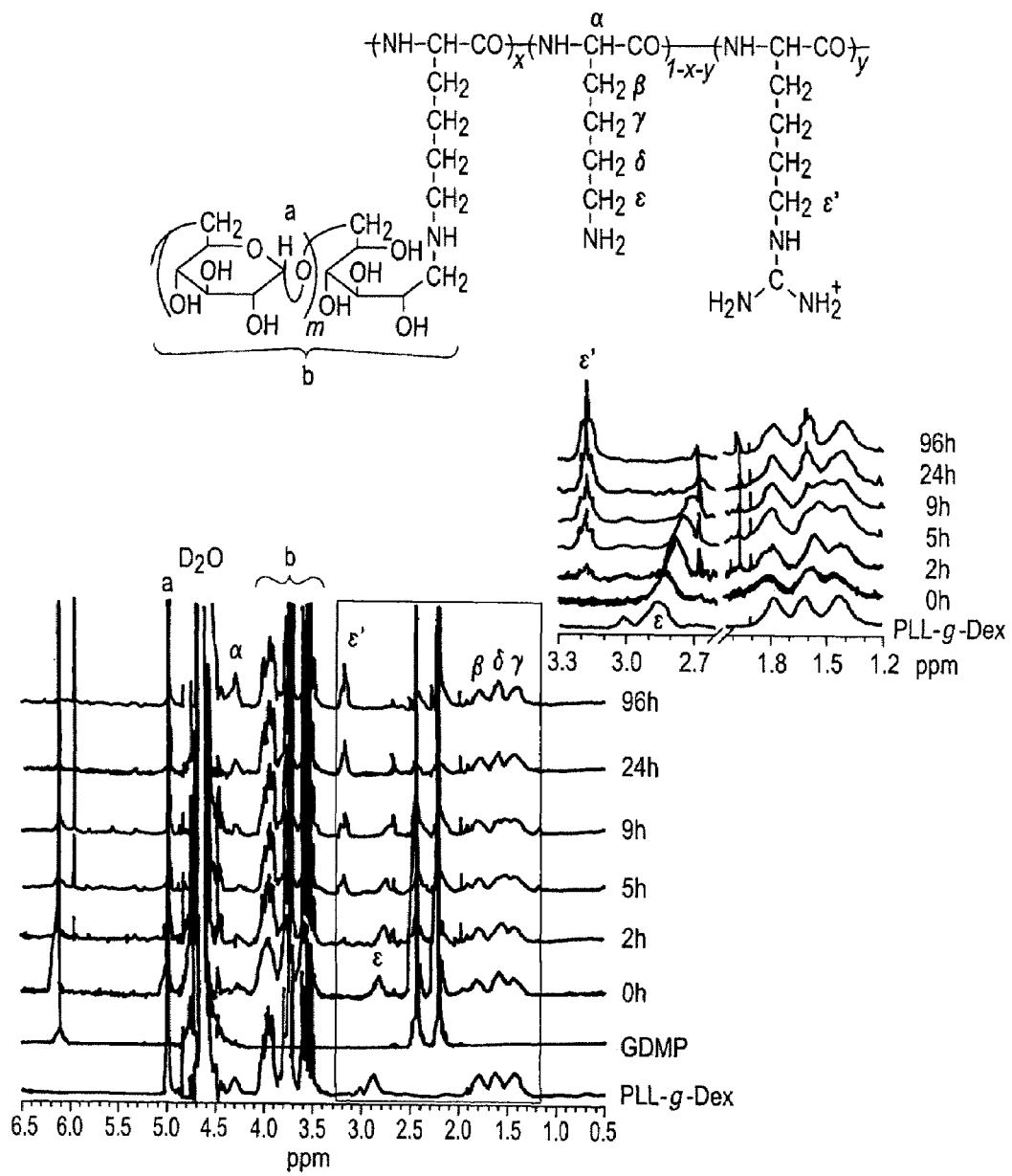
FIG. 1 is a drawing that shows change over time of the $^1$H NMR spectrum during the reaction of guanidination of PLL-g-Dex.

The guanidino group in the main chain that constitutes the cationic polymer according to the invention can have any structure known by those skilled in the art. Particularly, a guanidino group derived from arginine, one of amino acids, is preferred. More preferably, the main chain has also a moiety derived from lysine.

Therefore, a particularly preferred example includes a cationic polymer having the main chain comprising a moiety obtained by guanidination of a polymer having a primary amino group or a secondary amino group.

The ratio of the residues having granidino group in the main chain of the cationic polymer according to the intended use may be appropriately selected by those skilled in the art, but particularly a ratio of 0.3 to 1 is preferred. That is, the ratio of arginine and lysine residues in the main chain of the cationic polymer is preferably 1:0 to 0.1:0.9, more preferably 1:0 to 0.3:0.7. The numbers of arginine and lysine residues contained in polyarginine and polylysine blocks may be appropriately selected by those skilled in the art, but are usually in the range of 10-5,000.

Preferably, the cationic polymer according to the invention has a hydrophilic functional group in the side chain. The hydrophilic functional group may be any group well-known by those skilled in the art. Examples include water-soluble polyalkylene glycols such as polyethylene glycol; water-soluble polysaccharides such as dextran, the maltohexaose, pullulan, amylose, and arabinogalactan; water-soluble polyamino acid containing hydrophilic amino acids such as serine, asparagine, glutamine, and threonine; water-soluble polymer synthesized using acrylamide and derivatives thereof as a monomer; water-soluble polymer synthesized using methacrylic acid, acrylic acid, or derivatives thereof (e.g., hydroxyethyl methacrylate) as a monomer; and polymer synthesized using one or more water-soluble polymer selected from a group consisting of polyvinyl alcohol and derivatives thereof.

The side chain comprising the hydrophilic functional group such as hydrophilic polymer binds to an appropriate site such as the primary amino group or secondary amino group of the cationic polymer in a graft-shape according to a method well known by those skilled in the art.

Further, the molecular weight of the cationic polymer, the chain length of the side modifying chain group itself, and the extent of grafting is not limited because the optimum values may vary depending on the intended use. However, those skilled in the art can select each optimum value with reference to the examples that will be described below.

For example, the molecular weight as a free salt may be 2,000 to 200,000, the content of graft-shape side chain derived from the hydrophilic polymer may be 30 to 90% by weight, and the grafting ratio may be 5-40%.

The invention provides a preparation having the cationic polymer mentioned above as an active ingredient. The preparation can be constituted by crude of synthesized polymer or its purified polymer, and buffer or normal saline as necessary, provided that it will not have any adverse effects on the intended exchange reaction. The polymer may be a mixture having one or more types of the polymer.

The cationic polymer as described will be generally selected to attain a charge ratio of 0.1 or more, preferably 0.5 to 1000 between the cationic moiety and the phosphate in total DNA or RNA (single stranded and double stranded) provided for the exchange reaction. On the other hand, the mole ratio of the single stranded DNA or RNA to be used in the exchange reaction for the double stranded DNA or RNA may be advantageously selected to be 5 or more.

The exchange reaction can be carried out at a temperature in which the double stranded DNA or RNA will not be denatured by heat, and without need of a cofactor such as ATP or $Mg^{2+}$. Preferably the temperature may be about 5° C. to 40° C., which is a physiologically acceptable temperature wherein no adverse effect on the cell of the organism occurs.

The cationic polymer of the invention can efficiently exchange the nucleotide sequence at the specific site of the double stranded DNA or RNA for its homologous nucleotide sequence of the single stranded. DNA and RNA under above condition. Theoretically, the oligonucleotide has any chain length provided that it is 5 mer or longer. Preferably, the invention may be applied to a sequence having a length between 10 and 500 mer. Therefore, the preparation of the cationic polymer of the invention is useful in hybridization of a primer or probe, or an oligonucleotide carrying a known label or agent with the double stranded DNA or RNA; and in PCR or RT-PCR process or a process using a DNA chip that utilizes the feature of a primer, probe or oligonucleotide hybridized to a specific site of the double stranded DNA or RNA, and in nucleic acid analysis that utilizes fluorescence in situ hybridization.

In addition, the cationic polymer according to the invention is also useful in accelerating the exchange between a specific site of the double stranded mRNA and an antisense oligonucleotide, ribozyme, deoxyribozyme, or oligonucleotide for forming a triple strand that contains a sequence complementary thereto so as to improve gene control function of these oligonucleotides. The cationic polymer according to the invention is also useful in controlling or regulating the replication, transcription or expression process by exchanging a specific site of the genomic double stranded DNA for a nucleotide chain complementary thereto (by controlling the binding of a DNA binding protein).

Examples

Next, the invention will be described in detail with reference to examples, however, it should be appreciated that the invention will not be limited in any way by these specific examples.

Poly(L-lysine) (PLL, Mn=27,600) was purchased from Nacalai Tesque Inc (Kyoto, Japan). Dextran T-10 (Dex, Mn=8,700) was purchased from the Pharmacia BioTech Inc. (Uppsala, Sweden). 1-guanyl-3,5-dimethyl pyrazole nitrate ester (GDMP) as guanidinating agent was purchased from Sigma Aldrich Inc. (St. Louis, United States).

Oligonucleotide (ODN) of HPLC purification grade was purchased from Fasmac Co., Ltd. (Kanagawa, Japan), and its purity was checked by reverse phase HPLC.

Preparation of Poly(L-Lydine)-Graft-Dextran (PLL-g-Dex) Comb-Type Copolymer

PLL-g-dexedrine comb-type copolymer was prepared according to a method described in A. Maruyama, M. Katoh, T. Ishihara and T. Akaike, Bioconjugate Chem, 8, 3 (1997) and A. Maruyama, H. Watanabe, A. Ferdous, M. Katoh, T. Ishihara and T. Akaike, Bioconjugate Chem. 9,292 (1998).

Particularly, the copolymer was prepared by the reductive amination reaction of PLL-HBr by Dex in borate buffer, and purified by ultrafiltration using Saltrius ultrafiltration machine (MWCO 20000, Saltrius AG, Goettingen, Germany). The resulting copolymer was freeze-dried and its molecular weight was finally determined using SEC-MALS and $^1$H-NMR (as free salt, Mn=95,000, Dex content=82.9% by weight, grafting ratio Dex=7.4%).

Guanidination of PLL-g-Dex Comb-Type Copolymer

The guanidination of PLL-g-Dex is shown in the following scheme 1. PLL-g-Dex (10 mg, 13.3 μm mol (primary amino group), and GDMP (13.4 mg, 66.6 μmol) were dissolved independently in 400 μL. Each solution was adjusted to pH 9.5 by 5M NaOH in $D_2O$ (final concentration of the primary amino group: 13 mM, final concentration of GDMP: 67 mM). Solutions were mixed, and put into a NMR sample tube. In order to evaluate change over time of guanidination of PLL-g-Dex, the reaction was carried out at 37° C. in a NMR spectrometer (96 hours), while the change over time of $^1$H-NMR spectrum was recorded (FIG. 1).

Figure 2:
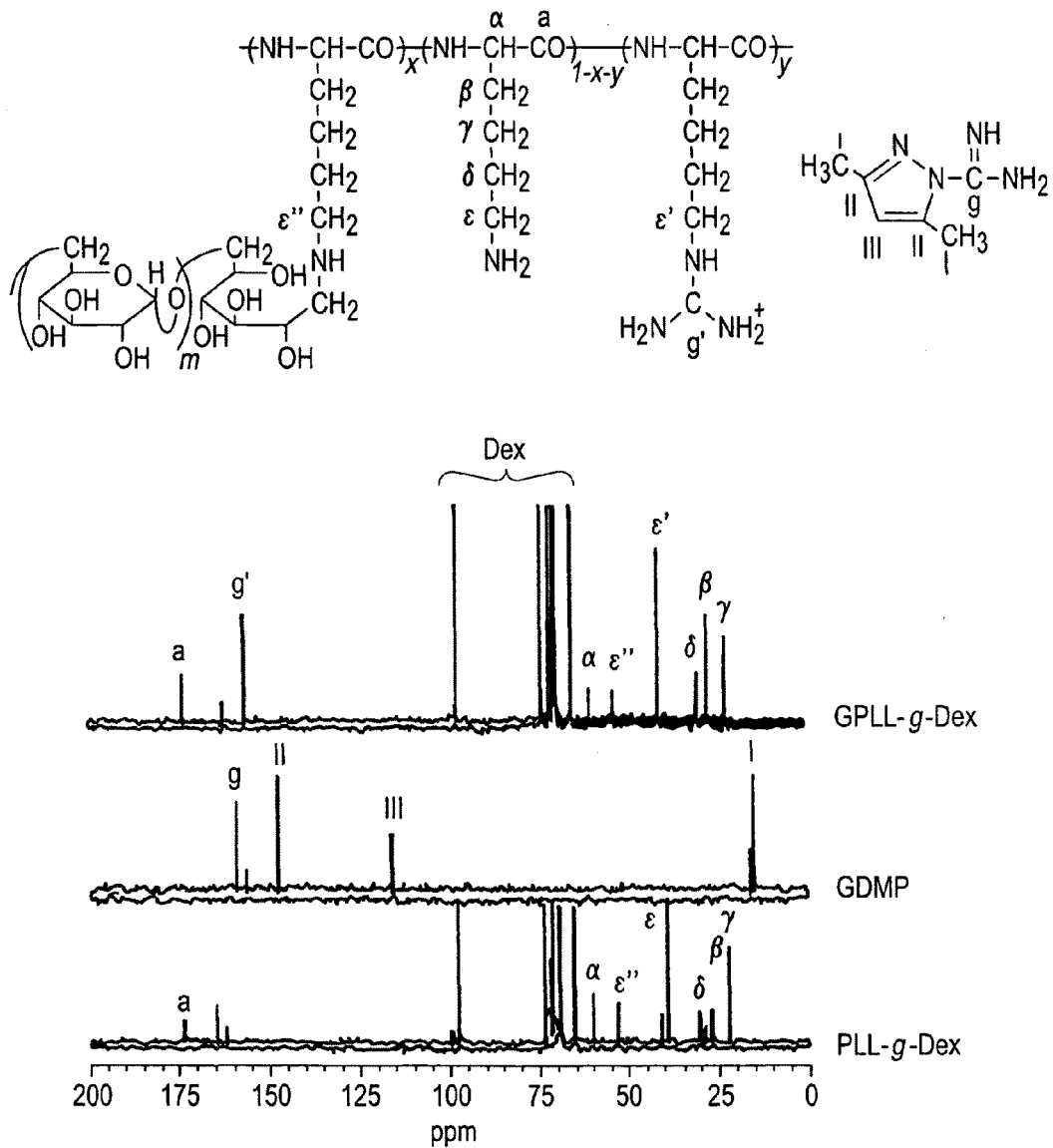
FIG. 2 is a drawing that shows $^{13}$C NMR spectrum of the copolymer (GPLL-g-Dex) obtained after purification.

It was expected that the peak (3.2-2.7 ppm range) of ∈-methylene proton would shift by guanidination. As shown in FIG. 1, with progress of the reaction, the peak of ∈-methylene proton at 2.8 ppm declined, and the peak of ∈-methylene proton at 3.2 ppm corresponding to the peak of ∈-methylene proton at the guanidinated site of lysine gradually increased. Finally, the peak of ∈-methylene proton disappeared. This indicates that the primary amino group is totally substituted with guanidino group during reaction for 96 hours. The resultant copolymer was separated by dialysis to Milli-Q water using Spectra/Por7 film of MWCO 25,000 (Spectrum Lab., Rancho Dominguez, USA), to remove unreacted GDMP. Guanidinated PLL-g-Dex (GPLL-g-Dex) was obtained by subsequent freeze-dry (yield 84.3%). FIG. 2 shows $^{13}$C-NMR spectrum of the copolymer obtained after purification. A new peak (g') appears at 156.6 ppm, which clearly indicates that the guanidino group was incorporated in the copolymer. Furthermore, as no unexpected change was observed in $^1$H-NMR and $^{13}$C-NMR spectrum, side reaction during guanidinatation can be neglected.

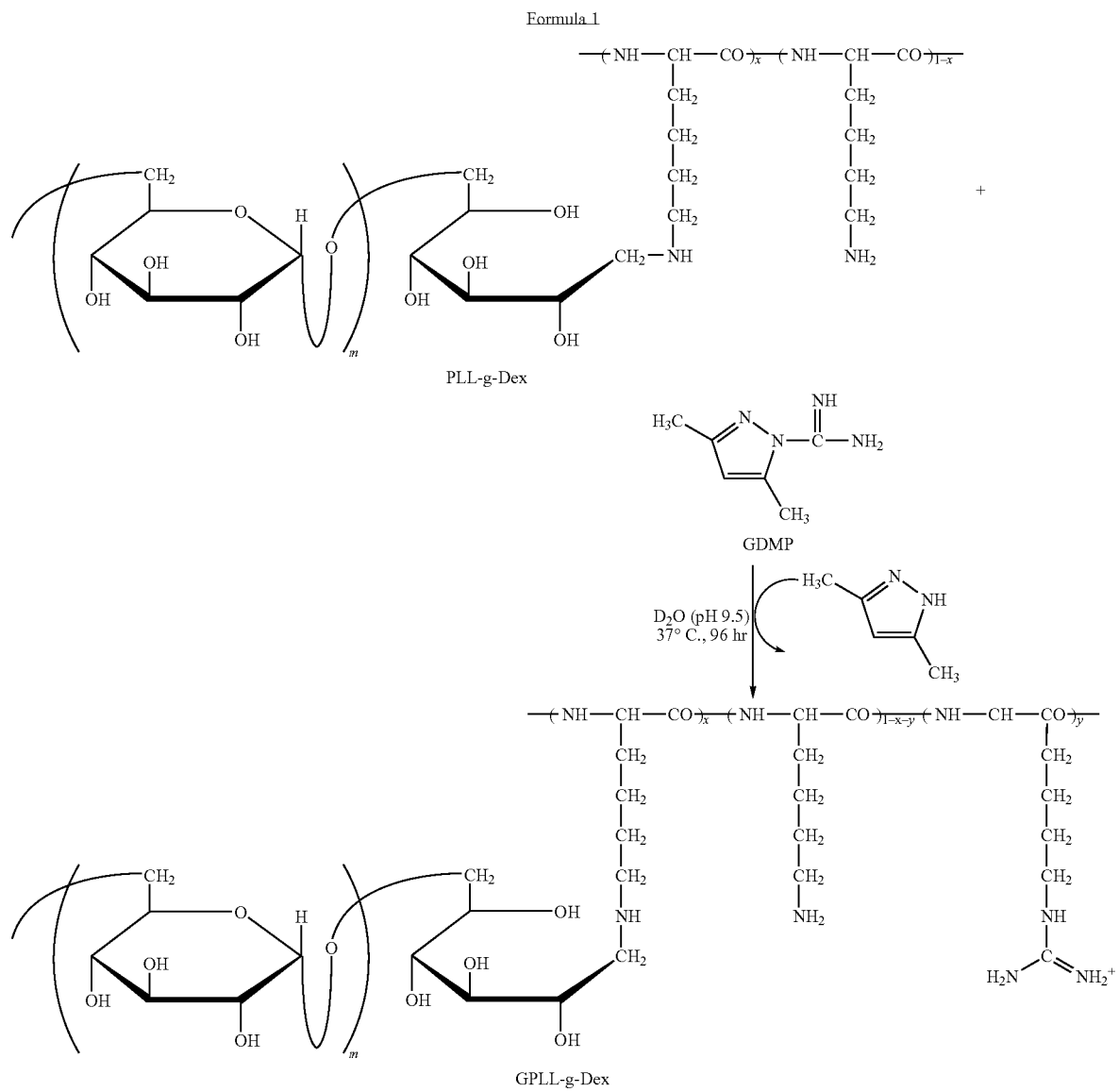

Formula 1

The resultant copolymer was dissolved in $D_2O$ (99.95% D; Merk Darmstadt, Germany).

$^1$H-NMR spectrum (270 MHz) was determined using JEOL JNM-EX270 spectrometer (JEOL, Ltd., Tokyo, Japan) at the probe temperature of 25° C. or 37° C. Chemical shift is expressed as ppm using 3-trimethyl silyl propionated sodium-2,2,3,3-d4 (TSP) as an external control. The guanidination was calculated from the peak area of ∈-methylene protone of PLL.

After purification of GPLL-g-Dex, $^{13}$C-NMR spectrum (125 MHz) was determined using JEOL JNM-GX500 spectrometer (JEOL Ltd., Tokyo, Japan) by at 25° C., using TSP as an external control.

Size Exclusion Chromatography Multiple Angle Light Scattering (Sec-MALS)

The resultant copolymer was analyzed using size exclusion chromatography (SEC) system (Jasco model 800 Tokyo, Japan), on the Shodex OHpak SB-804 and 806 M column connected to a multiple angle light scattering (MALS) detector (Dawn-EOS, Wyatt Technology, Santa Barbara, Calif.) and reflective index (RI) detector. As a mobile phase, 0.5 M acetic acid aqueous solution and 0.2M $Na_2SO_4$ aqueous solution were used at 25° C., 0.8 mL/min. Aliquot (100 μL) of graft copolymer solution (10 mg/mL) was injected into the column. Number average molecular weight (Mn) and weight average molecular weight (Mw) were calculated from RI and MALS signals using Astra (Wyatt Technology) for Windows (trade mark) Ver. 4.90. Values of dn/dc were determined by assuming that the collection of specimen from the column was 100%.

Figure 3A:
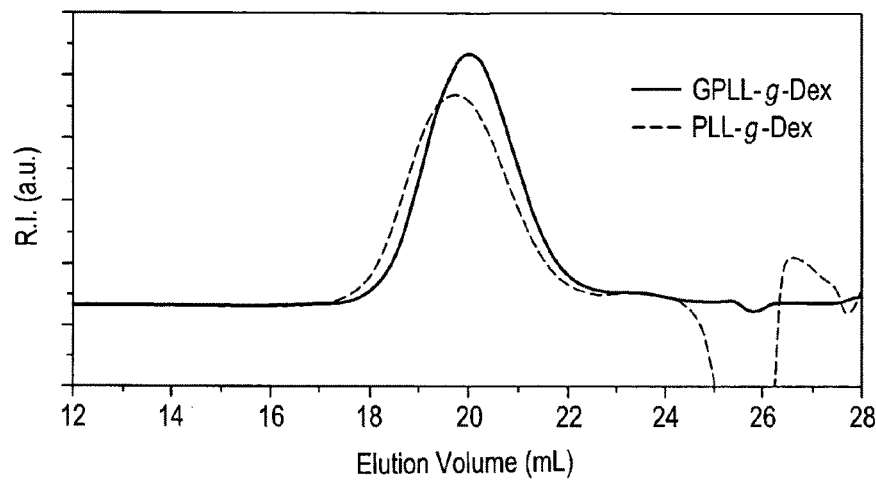
FIG. 3 is a drawing that shows the measurement result of GPLL-g-Dex and PLL-g-Dex by Sec-MALS.
Figure 3B:
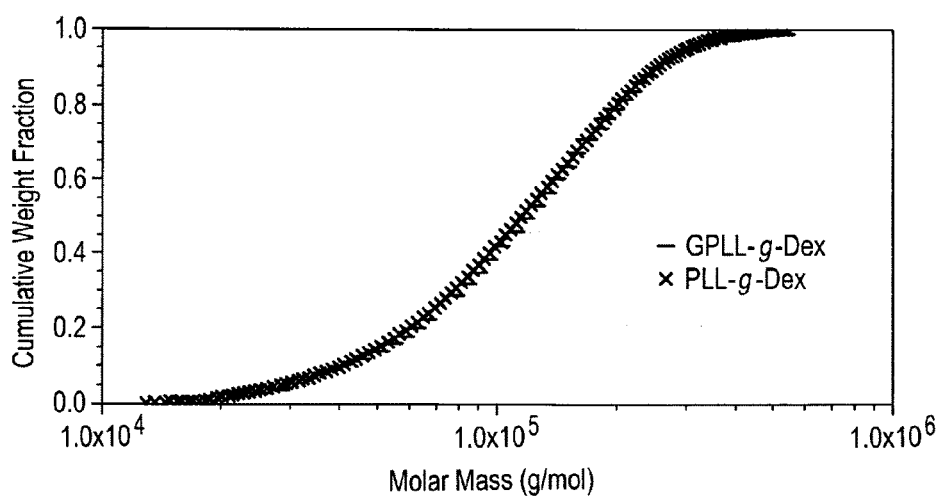

The measurement result by Sec-MALS of GPLL-g-Dex and PLL-g-Dex is shown in FIG. 3. The molecular weight and its distribution determined by MALS (FIG. 3b) showed little change. Since PLL content in copolymer is only 17.1% by weight, theoretically, the molecular weight of copolymer increases by 5% by guanidination of PLL-g-Dex. Therefore, it is rational that guanidination of copolymer was hardly detected by the change in molecular weight. On the other hand, FIG. 3b clearly shows that significant fragmentation of PLL or Dex chain did not occur during guanidination.

However, elution of GPLL-g-Dex was slightly delayed by guanidination (FIG. 3a). The delay might be caused by change in conformation of copolymer between copolymer and fillers, or change in interaction between copolymer and column packing.

Figure 4:
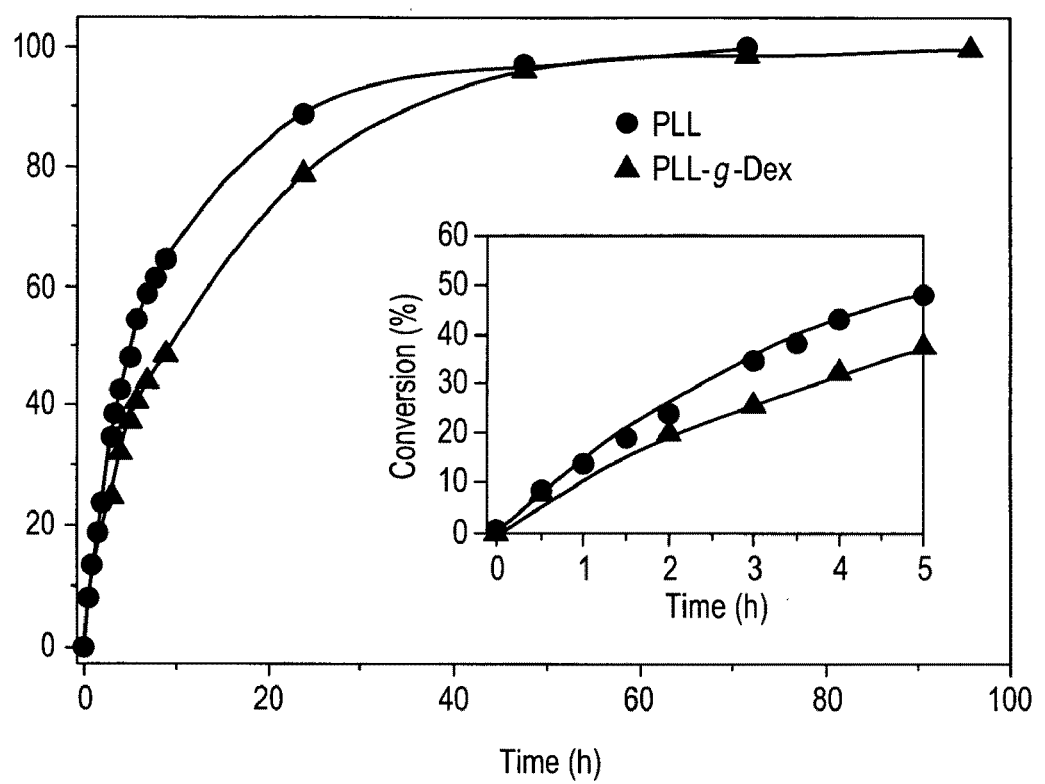
FIG. 4 is a drawing that shows change over time after guanidination of PLL-g-Dex copolymer and PLL homopolymer (Mn=27,600).

The change over time in guanidination of PLL-g-Dex copolymer and PLL homopolymer (Mn=27,600) at 37° C. is shown in FIG. 4. The conversion rate of PLL and PLL-g-Dex reached to 96% or more during the reaction for 45 hours. However, the reaction rate of PLL was higher than that of PLL-g-Dex. Since GDMP is a low-molecular-weight reagent, this difference cannot be attributed to the effect of steric constraint of grafted Dex chain. Rather, it may be caused by change in microenvironment such as dielectric constant around PLL backbone by grafted Dex chain.

Measurement of UN Melting Curve

The nucleotide sequence of ODN used for the following UV melting curve measurement was as follows: ODN 1: 5'-TCC TCG CCC TTG CTC ACC AT-3' (SEQ ID NO: 1); ODN 2: 5'-ATG GTG AGC AAG GGC GAG GA-3' (SEQ ID NO: 2). The double stranded DNA was prepared by mixing an equimolar amount of ODN1 and ODN2, annealed at 95° C. for 5 minutes, and gradually cooled to a room temperature over 16 hours. Other solvents and chemicals of a reagent grade were purchased from Wako Pure Chemical Industries, Ltd. (Osaka, Japan), and used without further purification.

Preservation solution was prepared by dissolving nucleotide in buffer I (10 mM PBS (pH 7.2) containing 150 mM NaCl and 0.5 mM EDTA). The concentration of the undiluted solution was calculated using the molar absorbance coefficient at 260 nm ($1.65 \times 10^5$ $M^{-1}$ $cm^{-1}$ (ODN1), $2.11 \times 10^5 M^{-1}$ $cm^{-1}$ (ODN2)). The solution for UV melting curve measurement was prepared by diluting the preservation nucleotide solution (final concentration 27.8 µM) with buffer I. The mixture of the diluted nucleotide solution was heated at 90° C. for 5 minutes, then gradually cooled and was left at a room temperature for 16 hours. The undiluted solution of the copolymer was diluted with buffer I to obtain various concentrations. The diluted solution of nucleotide and copolymer was mixed by micropipet to obtain various N/P ratios ([amino group] copolymer/[phosphate group] DNA).

UV spectrum and UV melting curve were recorded by Shimadzu UV-1600 PC spectrometer equipped with TMSPC-8 thermoregulator (Shimadzu Corporation, Kyoto, Japan).

UV melting curve was recorded by /1 Kmin as heating rate. Differential absorbance ($\Delta A = A_{260} - A_{340}$) was calculated to correct baseline shift. The first derivative [d ($\Delta A$)/dT] was calculated from melting curve data. The peak temperature in the derivative curve was defined as the melting temperature (Tm).

Influence of Guanidination on Interaction between DNA/Copolymer

Figure 5A:
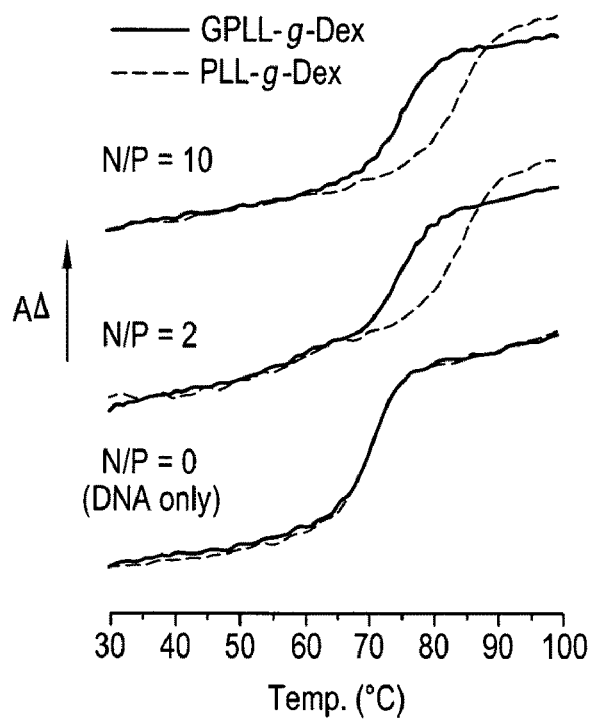
FIG. 5 is a drawing that shows UV melting curve and Tm value of 20 bp dsDNA in the presence or absence of comb-type copolymer at various N/P ratios.
Figure 5B:
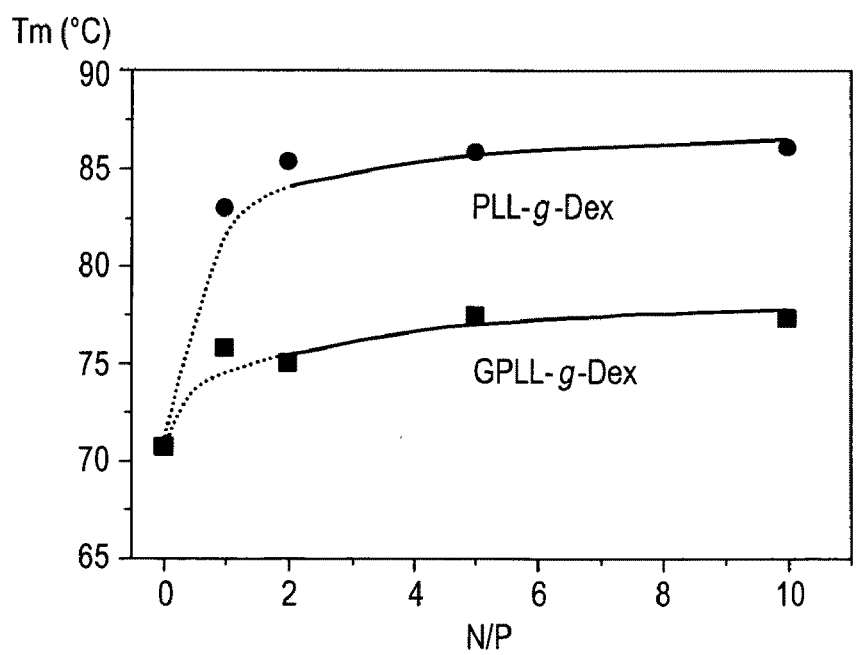

Influence of guanidination on interaction between DNA/copolymer was analyzed by dissolution analysis of double stranded DNA. FIG. 5 indicates UV melting curves and Tm values of 20 bp dsDNA under the presence or absence of the comb-type copolymer at various N/P ratio from 0 (DNA only) to 10. When DNA only, transition from double strand to single strand was observed at 70.3° C. in physiological ionic strength (10 mM PBS-150 mM NaCl). Increase in Tm of dsDNA was observed under a condition where either PLL-g-Dex or GPLL-g-Dex was present. The increase of Tm reached to plateau at N/P ratio 2, and remained same until N/P ratio 10 (FIG. 5b). PLL-g-Dex increased Tm by 15° C., while GPLL-g-Dex increased Tm by 5° C. only. It is considered that the comb-type copolymer stabilizes double stranded and triple stranded DNA mainly by suppressing the static electricity repulsive force in DNA chain (A. Maruyama, M. Katoh, T. Ishihara and T. Akaike, Bioconjugate Chem, 8, 3 (1997); A. Maruyama, H. Watanabe, A. Ferdous; M. Katoh, T. Ishihara and T. Akaike, Bioconjugate Chem. 9, 292 (1998); A. Maruyama, Y-I. Ohnishi, H. Watanabe, H. Torigoe, A. Ferdous and T. Akaike, Colloids Surf. B 16, 273 (1999)). Therefore, from the result in FIG. 5, the affinity of the ion of GPLL-g-Dex to dsDNA may be weaker than that of PLL-g-Dex.

Figure 6A:
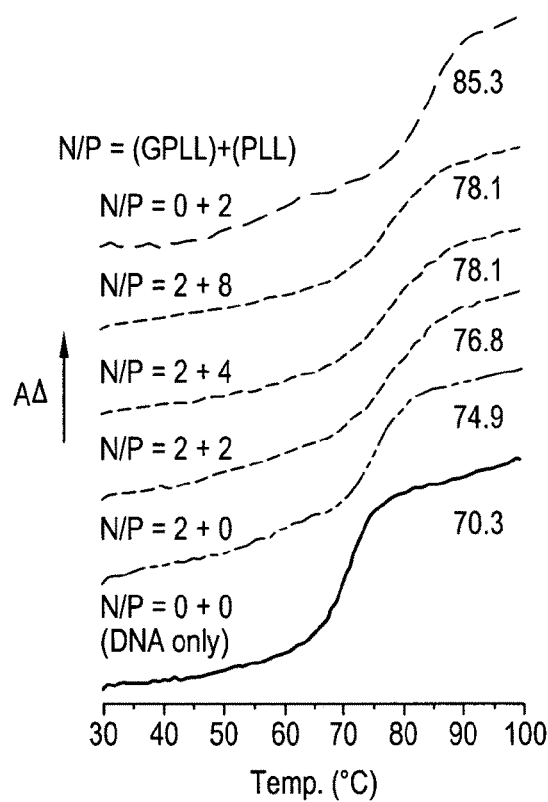
FIG. 6 is a drawing that shows the result of Tm measurement of the affinity of the copolymer to DNA.
Figure 6B:
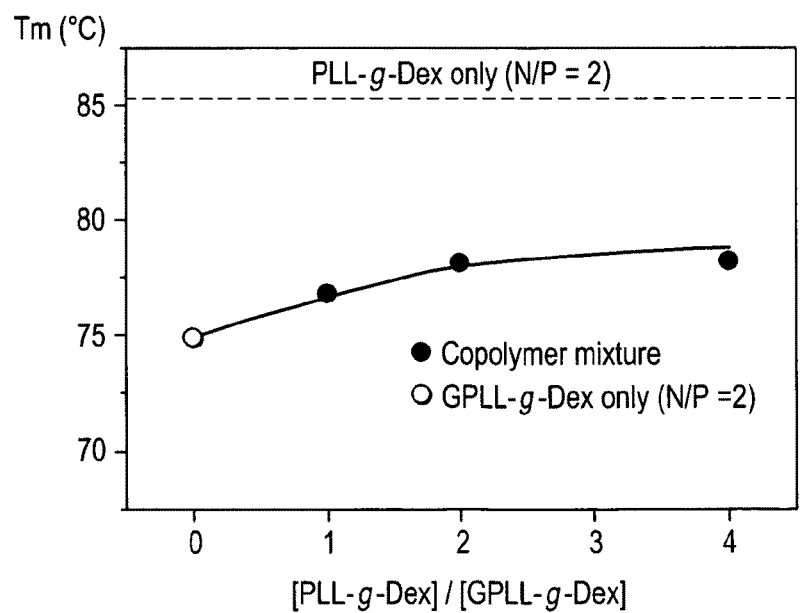

Next, the affinity of the copolymer to the DNA was evaluated by Tm measurement (FIG. 6). The solutions of PLL-g-Dex and GPLL-g-Dex were put into a DNA solution together to obtain predetermined N/P ratio. The N/P ratio of PLL-g-Dex was adjusted to 2, 4, and 8, while the N/P ratio of GPLL-g-Dex was kept at 2. It should be noted that Tm showed little increase under the presence of GPLL-g-Dex, although an excessive concentration of PLL-g-Dex was present (up to 4 times GPLL-g-Dex as shown in FIG. 6b). These results show the selective interaction of dsDNA and GPLL-g-Dex, and mean that the affinity of GPLL-g-Dex to dsDNA is much higher than that of PLL-g-Dex.

The above result suggests the possibility that the stability of dsDNA is influenced not only by affinity to dsDNA but also by interaction in other mode. It was reported that affinity of oligoarginine to DNA is stronger than that of oligolysine. Both oligoarginine and oligolysine mainly interact with DNA via ionic interaction. However, hydrogen bond interaction contributes to the strong interaction between oligoarginine and DNA (D. P. Mascotti and T. M. Lohman, Biochemistry 36 and 7272 (1997)). Similarly, the stronger affinity of GPLL-g-Dex than PLL-g-Dex may be attributable to the hydrogen bond interaction between guanidino group and DNA. The involvement of the hydrogen bond between copolymer and DNA may cause weaker stabilizing effect of GPLL-g-Dex to dsDNA. These findings are in line with a finding disclosed in a conventional study that arginine in dipeptide Arg-Glu can form hydrogen bond with nucleic acid phosphate like cytosine in single stranded DNA, and guanosine in single stranded or double stranded DNA (G. Lancelot, R. Mayer and C. Helene, Biochem, Biophys. Acta 564,181 (1979)).

Analysis of Chain Exchange Reaction

The base sequences of ODN used for the following analysis experiment of a chain exchange reaction were as follows: ODN1 (5'-TCC TCG CCC TTG CTC ACC AT-3') (SEQ ID NO: 1; ODN2 (5'-ATG GTG AGC AAG GGC GAG GA-3') (SEQ ID NO: 2); ODN3 (5'-ATG GTG AGC AAG GGC GAG GA-3' (FITC) (SEQ ID NO: 3)). In the solution of the double stranded DNA, an equimolar amount of ODN1 and ODN3 were mixed, annealed at 95° C. for 5 minutes, and slowly cooled to a room temperature over 16 or more hours for preparation. In the solution of the single stranded DNA, ODN2 was used as a sample. Other solvents and chemicals of a reagent grade were purchased from Wako Pure Chemical Industries, Ltd. (Osaka, Japan), and used without further purification.

Preservation ODN solution was prepared by dissolving ODN in buffer I (10 mM PBS (pH 7.2) containing 150 mM NaCl). The concentration was calculated based on the molar absorbance coefficient at 260 nm. ($1.65 \times 10^5$ $M^{-1}$ $cm^{-1}$ (ODN1) and $2.11 \times 10^5$ $M^{-1}$ $cm^{-1}$ (ODN2, ODN3)). The undiluted solutions of PLL-g-Dex and GPLL-g-Dex as copolymer were dissolved with buffer I for preparation. The concentration was calculated based on the average molecular weight.

The solution for analysis of chain exchange reaction rate was adjusted to the intended concentration by diluting these preservation solutions with buffer I.

First, the solution of the double stranded DNA and the solution of copolymer were mixed to be N/P=2. Next, the solution of the single stranded DNA was added to start chain exchange reaction (final concentrations were, 0.5 μM for double stranded DNA, 2.5 μM for single stranded DNA for exchange). The reaction temperature was 15° C.

When the intended reaction time (up to 6 hours) was reached, in order to negate the interaction between ODN and copolymer to stop the chain exchange reaction, an excessive amount of Salmon sperm DNA was added. In gel electrophoresis, 13% polyacryloamide gel as electrophoresis gel, and TBE buffer solution (reagent containing EDTA in Tris borate buffer) as electrophoresis buffer were used. After loading an ODN sample to this gel for electrophoresis, the electrophoresis was carried out under condition of a room temperature for one hour at 100V.

After electrophoresis, electrophoresis gel was obtained that shows the double stranded ODN3 and the single stranded ODN3 by fluorescence band by FITC. The transition from the double strand to the single strand indicates the progress of chain exchange reaction.

Figure 7:
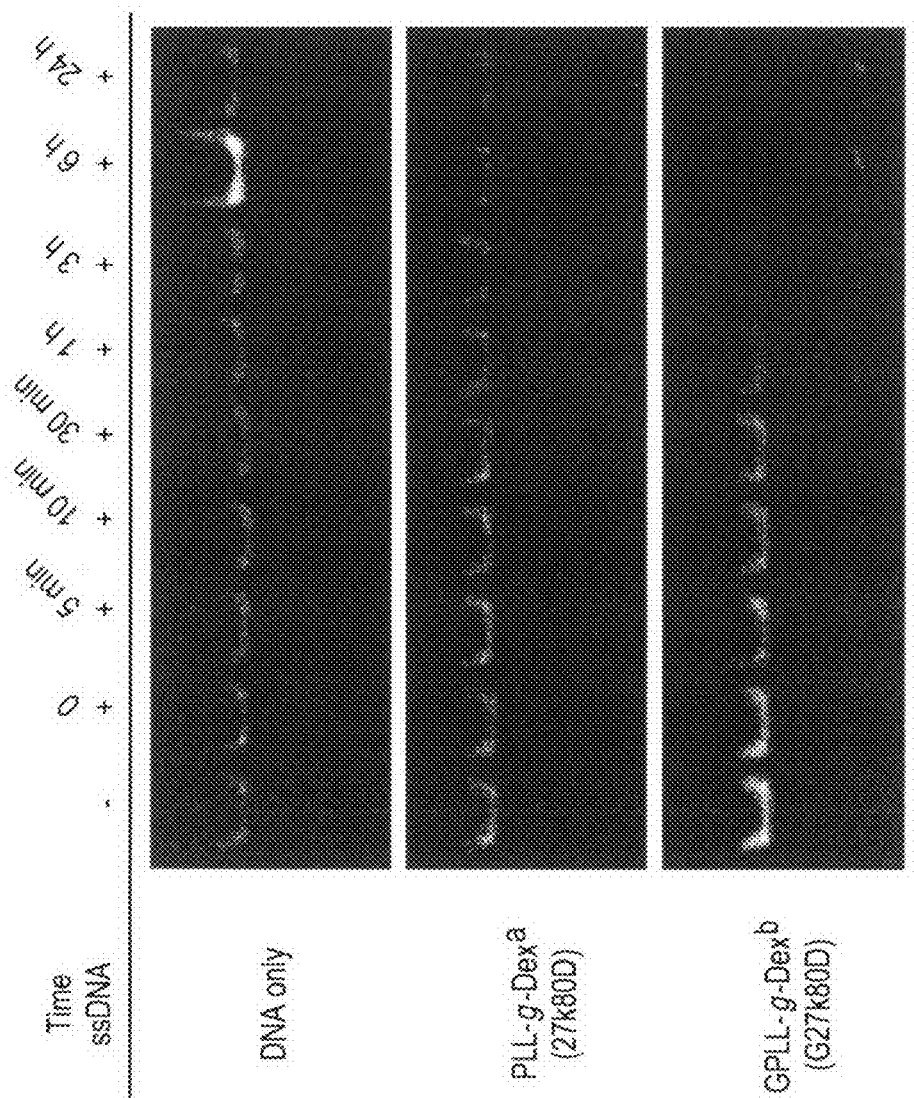
FIG. 7 is a photograph of electrophoresis gel image that shows the progress of chain exchange reaction.
Figure 8:
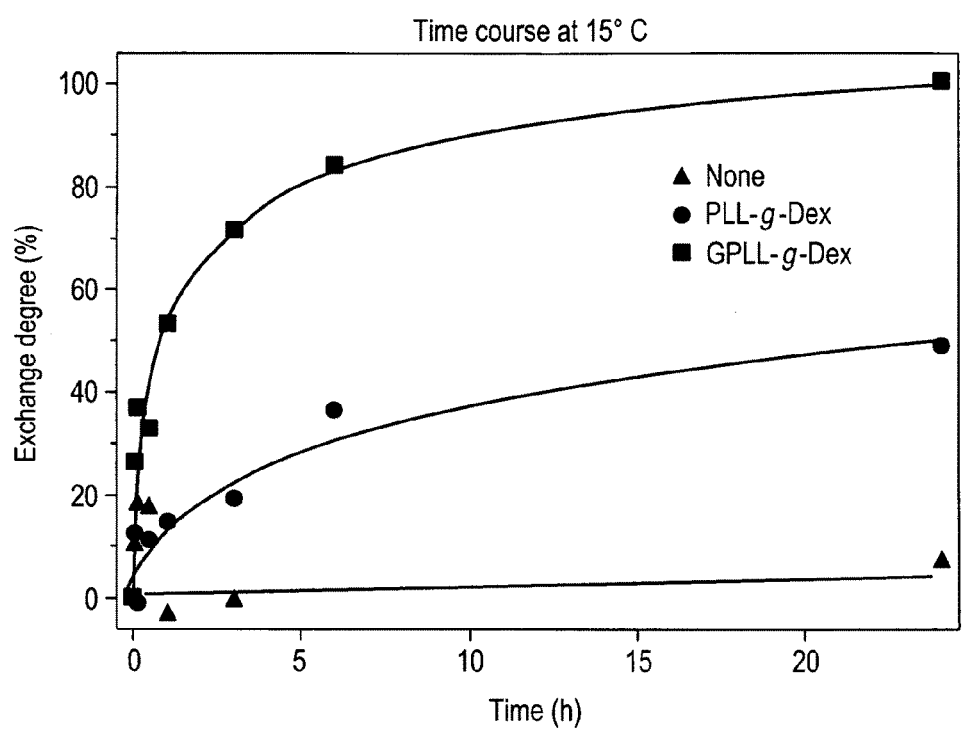
FIG. 8 is a graph that shows the progress of a chain exchange reaction.

Using LAS-3000 fluorescence image analyzer (Fuji Photo Film Co., Ltd., Kanagawa, Japan), the electrophoresis gel (FIG. 7) was imaged to quantify the abundance ratio of the fluorescence band. The abundance ratio of this fluorescence band was used as the chain exchange rate (FIG. 8).

As a result, the difference in influence on chain exchange reaction was observed between PLL-g-Dex and GPLL-g-Dex. The result clearly showed that the GPLL-g-Dex raised the exchange rate more than PLL-g-Dex.

Analysis of Polyion Complex Formation

The ODN base sequences used for the analysis experiment of polyion complex formation (IPECs: InterPolyElectrolyte-Complexes) were as follows: ODN1 (5'-TCC TCG CCC TTG CTC ACC AT-3') (SEQ ID NO: 1); ODN3 (5'-ATG GTG AGC AAG GGC GAG GA-3' (FITC) (SEQ ID NO: 3)). In the double stranded DNA solution, an equimolar amount of ODN1 and ODN3 were mixed, annealed at 95° C. for 5 minutes, and slowly cooled to a room temperature over 16 or more hours for preparation. In the single stranded DNA solution, ODN3 was used as a sample. Other solvents and chemicals of a reagent grade were purchased from Wako Pure Chemical Industries, Ltd. (Osaka, Japan), and used without further purification. Preservation ODN solution was prepared by dissolving ODN in buffer I (10 mM PBS (pH 7.2) containing 150 mM NaCl). The concentration was calculated based on the molar absorbance coefficient at 260 nm. ($1.65 \times 10^5 M^{-1} cm^{-1}$ (ODN1), $2.11 \times 10^5 M^{-1} cm^{-1}$ (ODN3)). The undiluted solution of PLL-g-Dex and GPLL-g-Dex as copolymer were dissolved by buffer I for preparation. The concentration was calculated based on the average molecular weight.

The solution for analysis of IPECs formation was adjusted to the intended concentration by diluting these preservation solutions with buffer I.

A mixed solution of the double stranded DNA (final concentration: 0.5 μM) and the single stranded DNA (final concentration: 1.0 μM) was added to the solution of copolymer at intended N/P ratio (0.0-2.0). Then the mixture was reacted at a room temperature for one hour to form IPECs. In gel electrophoresis, 13% polyacryloamido gel as electrophoresis gel, and TBE buffer solution (reagent containing EDTA in Toris borate buffer) as electrophoresis buffer were used. After loading an ODN sample to this electrophoresis gel, electrophoresis was carried out under condition of a room temperature for one hour at 100V.

After the completion of electrophoresis, electrophoresis gel was obtained that showed existence of free ODN3 by fluorescence band by FITC. Disappearance of fluorescence band in both the double strand and the single strand status indicates the extent of IPECs formation.

Figure 9:
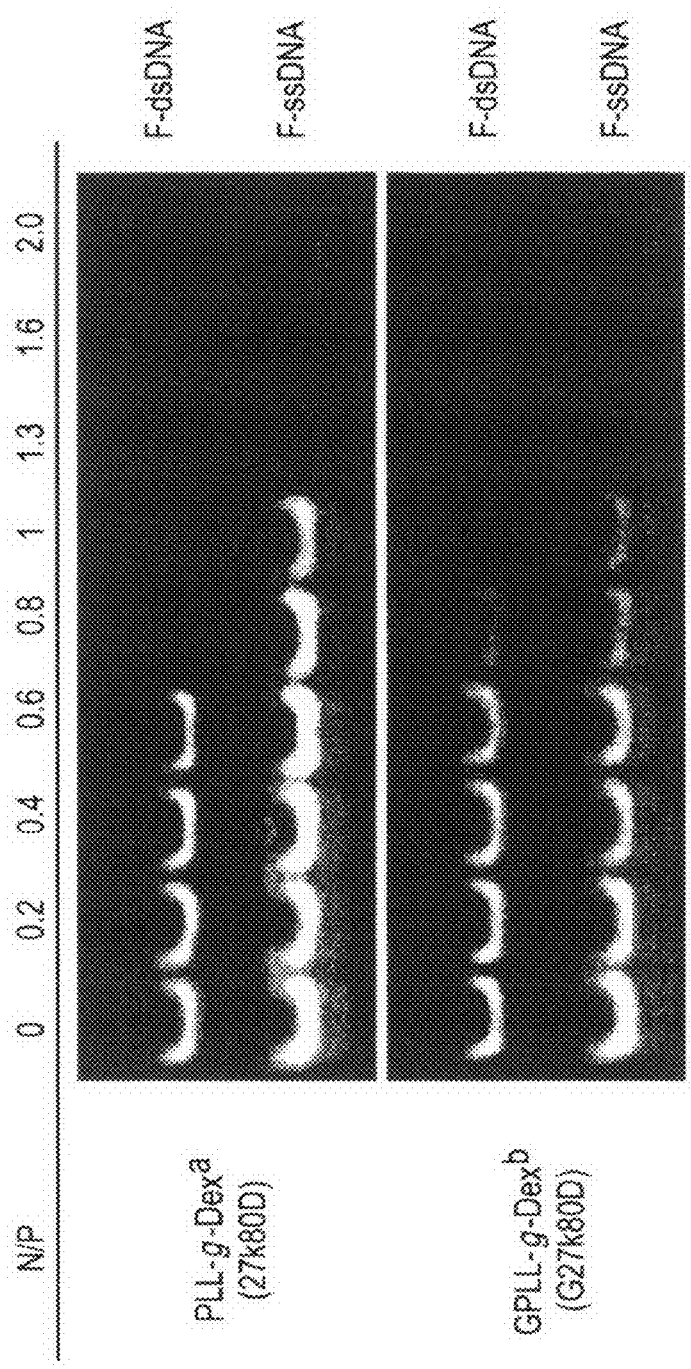
FIG. 9 is a photograph of electrophoresis gel that shows polyion complex forming ability of PLL-g-Dex and GPLL-g-Dex with ODN.

Using LAS-3000 fluorescence image analyzer (Fuji Photo Film Co., Ltd., Kanagawa, Japan), the electrophoresis gel (FIG. 9) was imaged.

As a result, the difference in the polyion complex formation ability of PLL-g-Dex to ODN, and that of GPLL-g-Dex to ODN was observed. Both PLL-g-Dex and GPLL-g-Dex formed complete complex to the double stranded DNA at N/P ratio of 1 or more, without significant difference. However, to the single stranded DNA, the binding ability of GPL-rg-Dex was higher than that of PLL-g-Dex.

INDUSTRIAL APPLICABILITY

The preparation according to the invention can be used in many fields, including gene analysis (SNPs analysis, DNA chip, PCR, etc.), a nano structure using nucleic acid, molecule machine, and nucleic acid medicine.

What is claimed:

1. A preparation for accelerating an exchange reaction between a nucleotide sequence at a specific site of a double stranded DNA or RNA and its homologous nucleotide sequence, comprising a cationic polymer of guanidinated poly(L-lysine)-graft-dextran (guanidinated PLL-g-Dex) having a guanidine group-containing main chain and a dextran-containing side chain as an active ingredient.

2. The preparation of claim 1, wherein the guanidine group is derived from arginine.

3. The preparation of claim 1 or 2, wherein the main chain of the cationic polymer comprises a moiety obtained by guanidination of a polymer having a primary amino group or a secondary amino group.

4. The preparation of claim 3, wherein the ratio of residues having the guanidino group in the main chain of the cationic polymer is 0.3 to 1.

5. The preparation according to claim 1, wherein the numbers of the arginine residues and the lysine residues contained in a polyarginine block or a polylysine block, respectively, are 10 to 5,000.

6. The preparation according to claim 1, wherein the dextran bonds to the primary amino group or secondary amino group of the cationic polymer in a graft-shape.

7. The preparation according to claim 1 wherein the cationic polymer has a molecular weight as a free salt is 2,000-200,000.

8. The preparation according to claim 1, wherein the content of graft-shaped side chain derived from the dextran is 30 to 90% by weight.

9. The preparation according to claim 1 wherein the grafting ratio is 5 to 40%.

10. The preparation according to claim 1, wherein the exchange reaction occurs in hybridization of fluorescence in situ hybridization (FISH), polymerase chain reaction, reverse transcription PCT (RT-PCR) or DNA chip with a DNA having target double stranded structure.

11. The preparation according to claim 1, wherein the exchange reaction occurs in exchange between a specific nucleotide sequence of a double stranded RNA and a single stranded sequence of antisense DNA, RNA, or ribozyme.

12. The preparation according to claim 1, wherein the exchange reaction occurs between a specific nucleotide sequence of double stranded DNA and it homologous nucleotide sequence so as to regulate expression and replication of a gene.

* * * * *

SEQUENCE LISTING

```
<160> NUMBER OF SEQ ID NOS: 3

<210> SEQ ID NO 1
<211> LENGTH: 20
<212> TYPE: DNA
<213> ORGANISM: Artificial Sequence
<220> FEATURE:
<223> OTHER INFORMATION: Synthetic oligonucleotide: ODN1

<400> SEQUENCE: 1
tcctcgccct tgctcaccat                                              20

<210> SEQ ID NO 2
<211> LENGTH: 20
<212> TYPE: DNA
<213> ORGANISM: Artificial Sequence
<220> FEATURE:
```

-continued

```
<223> OTHER INFORMATION: Synthetic oligonucleotide: ODN2

<400> SEQUENCE: 2
atggtgagca agggcgagga                                              20

<210> SEQ ID NO 3
<211> LENGTH: 20
<212> TYPE: DNA
<213> ORGANISM: Artificial Sequence
<220> FEATURE:
<223> OTHER INFORMATION: Synthetic oligonucleotide: ODN3 (FITC)

<400> SEQUENCE: 3
atggtgagca agggcgagga                                              20
```